US008069444B2

(12) United States Patent
Fedorova (10) Patent No.: US 8,069,444 B2
(45) Date of Patent: Nov. 29, 2011

(54) METHOD AND APPARATUS FOR ACHIEVING FAIR CACHE SHARING ON MULTI-THREADED CHIP MULTIPROCESSORS

(75) Inventor: Alexandra Fedorova, Lincoln, MA (US)

(73) Assignee: Oracle America, Inc., Redwood City, CA (US)

( * ) Notice: Subject to any disclaimer, the term of this patent is extended or adjusted under 35 U.S.C. 154(b) by 1490 days.

(21) Appl. No.: 11/511,804

(22) Filed: Aug. 29, 2006

(65) Prior Publication Data
US 2008/0059712 A1  Mar. 6, 2008

(51) Int. Cl.
*G06F 9/46* (2006.01)
*G06F 13/00* (2006.01)
(52) U.S. Cl. ......... 718/102; 718/100; 718/104; 711/130
(58) Field of Classification Search ........................ None
See application file for complete search history.

(56) References Cited

U.S. PATENT DOCUMENTS

| | | | |
|---|---|---|---|
| 5,619,665 A * | 4/1997 | Emma | 712/208 |
| 6,493,800 B1 | 12/2002 | Blumrich | |
| 6,549,930 B1 * | 4/2003 | Chrysos et al. | 718/104 |
| 6,618,742 B1 * | 9/2003 | Krum | 718/100 |
| 7,076,609 B2 | 7/2006 | Garg et al. | |
| 7,353,517 B2 * | 4/2008 | Accapadi et al. | 718/102 |
| 7,360,218 B2 * | 4/2008 | Accapadi et al. | 718/102 |
| 7,458,077 B2 * | 11/2008 | Duke | 718/102 |
| 7,475,399 B2 * | 1/2009 | Arimilli et al. | 718/104 |
| 7,707,578 B1 * | 4/2010 | Zedlewski et al. | 718/102 |
| 2004/0243457 A1 * | 12/2004 | D'Andrea et al. | 705/9 |
| 2005/0132375 A1 * | 6/2005 | Douceur et al. | 718/100 |
| 2006/0036810 A1 * | 2/2006 | Accapadi et al. | 711/132 |
| 2006/0090163 A1 * | 4/2006 | Karisson et al. | 718/105 |
| 2006/0143390 A1 * | 6/2006 | Kottapalli | 711/130 |
| 2006/0184741 A1 * | 8/2006 | Hrusecky et al. | 711/130 |
| 2006/0212853 A1 * | 9/2006 | Sutardja | 717/131 |
| 2006/0271937 A1 * | 11/2006 | Hack | 718/105 |
| 2007/0079074 A1 | 4/2007 | Collier | |
| 2007/0130568 A1 * | 6/2007 | Jung et al. | 718/104 |
| 2007/0300231 A1 * | 12/2007 | Aguilar et al. | 718/104 |

OTHER PUBLICATIONS

Spracklen et al., "Chip Multithreading: Opportunities and Challenges," in Proceedings of the 11th International Symposium on High-Performance Computer Architecture (HPCA-11), 2005.

(Continued)

*Primary Examiner* — Meng An
*Assistant Examiner* — Tammy Lee
(74) *Attorney, Agent, or Firm* — Robert C. Kowert; Meyertons, Hood, Kivlin, Kowert & Goetzel, P.C.

(57) ABSTRACT

In a computer system with a multi-core processor having a shared cache memory level, an operating system scheduler adjusts the CPU latency of a thread running on one of the cores to be equal to the fair CPU latency which that thread would experience when the cache memory was equally shared by adjusting the CPU time quantum of the thread. In particular, during a reconnaissance time period, the operating system scheduler gathers information regarding the threads via conventional hardware counters and uses an analytical model to estimate a fair cache miss rate that the thread would experience if the cache memory was equally shared. During a subsequent calibration period, the operating system scheduler computes the fair CPU latency using runtime statistics and the previously computed fair cache miss rate value to determine the fair CPI value.

20 Claims, 5 Drawing Sheets

OTHER PUBLICATIONS

Fedorova et al., "Cache-Fair Thread Scheduling for Multicore Processors," Harvard University Computer Science Group Technical Report TR-17-06, 2006.

Fedorova et al., "Performance of Multithreaded Chip Multiprocessors and Implications for Operating System Design," in Proceedings of USENIX 2005 Annual Technical Conference, Apr. 2005.

Kim et al., "Fair Cache Sharing and Partitioning in a Chip Multiprocessor Architecture," in Proceedings of the 13th International Conference on Parallel Architectures and Compilation Techniques, 2004.

Fedorova et al., "CASC: A Cache-Aware Scheduling Algorithm for Multithreaded Chip Multiprocessors," Sun Labs Technical Report TR 2005-0142, Apr. 2005.

Hily et al., "Standard Memory Hierarchy Does Not Fit Simultaneous Multithreading," in Proceedings of the Workshop on Multithreaded Execution Architecture and Compilation, Jan. 1998.

* cited by examiner

METHOD AND APPARATUS FOR ACHIEVING FAIR CACHE SHARING ON MULTI-THREADED CHIP MULTIPROCESSORS

BACKGROUND

In the recent years, the computer hardware industry has begun full-scale production of multi-core processors, which are processors that have multiple processing cores inside them. The multiple processing cores enable multiple application threads to run simultaneously on a single processor and present the promise of improved power efficiency, increased hardware utilization and reduced cost due to elimination of duplicated components. Consequently, most major hardware vendors are shipping multi-core systems and have announced plans to release future models.

Each processor core has a multi-level cache memory system in which a separate first-level (L1) cache memory may be provided for each core. A second-level (L2) cache memory is shared among the cores and the threads that may be running on each processor core. In other architectures, both the L1 and L2 cache memories may be shared. Conventional CPU schedulers schedule threads based on assumptions that often do not apply on multi-core processors. For example, such schedulers typically assume that the CPU is a single, indivisible resource and that, if threads are granted equal time slices, those threads will share the CPU equally. However, on multi-core processors, concurrently running threads, called "co-runners", often share a single cache memory, and cache allocation is controlled by the hardware.

Figure 1A:
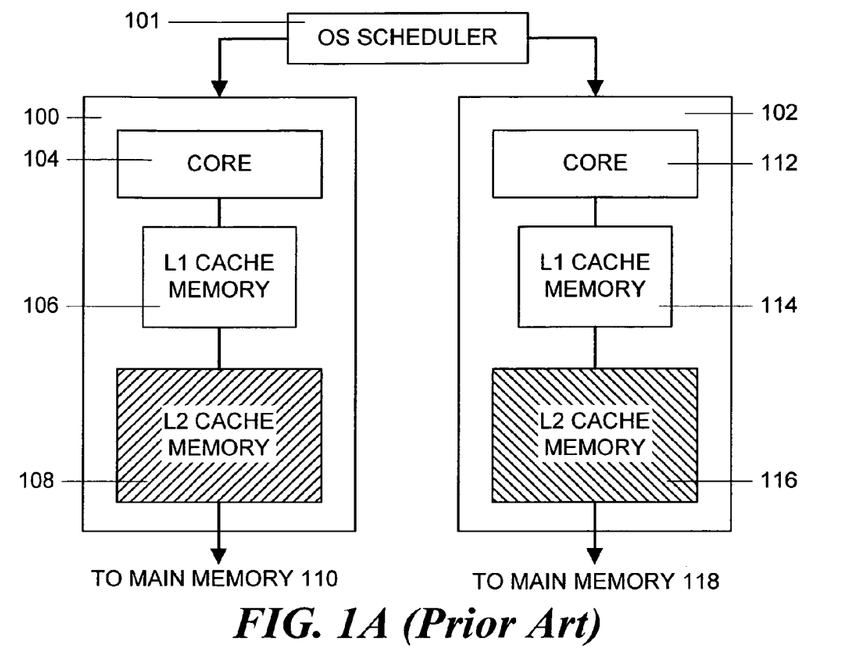
FIG. 1A is a block schematic diagram of a computer system in which a conventional operating system scheduler controls two single core processors that each has a dedicated cache memory hierarchy.

FIG. 1A shows a pair of conventional processors 100 and 102 which are controlled by an operating system scheduler 101. The operating system scheduler 101 determines which threads run on the processors and the length of time, or time quantum, that each thread runs. Processor 100 includes a processor core 104. Processor core 104 accesses memory via a hierarchical cache memory comprising L1 cache memory 106 and L2 cache memory 108. It is assumed that the thread running on core 104 utilizes all of the L2 cache memory 108 as indicated by the shading of cache memory 108. A miss in the L2 cache memory 108 causes the processor core 104 to access main memory as indicated by arrow 110. Similarly, processor 102 includes a processor core 112. Processor core 112 accesses memory via a hierarchical cache memory comprising L1 cache memory 114 and L2 cache memory 116. It is assumed that the thread running on core 112 utilizes all of the L2 cache memory 116 as indicated by the shading of cache memory 116. A miss in the L2 cache memory 116 causes the processor core 112 to access main memory as indicated by arrow 118.

Figure 1B:
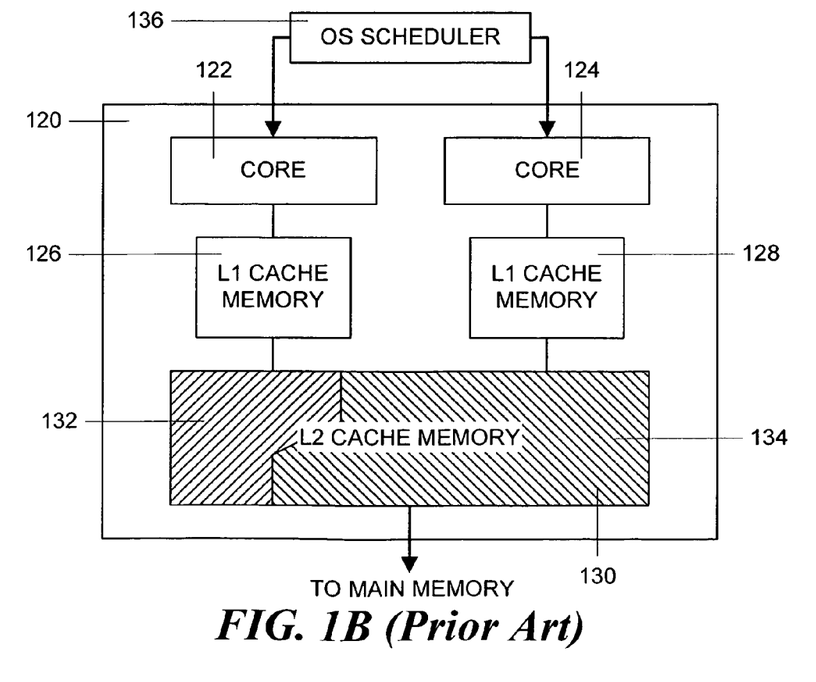
FIG. 1B is a block schematic diagram of a conventional computer system in which a conventional operating system scheduler controls a single dual-core processor wherein both cores share a portion of the cache memory hierarchy.

FIG. 1B shows a similar situation where the same threads that are running on processor cores 104 and 112 are, instead running on processor cores 122 and 124 of multi-core processor 120. Processor cores 122 and 124 are, in turn, controlled by operating system scheduler 136 which determines the threads that run on the cores 122 and 124 and the amount of time that the threads run. In this situation, each of processor cores 122 and 124 has its own L1 cache memory 126 and 128, respectively. However, both cores 122 and 124 share the L2 cache memory 130. The cache memory shading illustrates the working set of the two threads running on cores 122 and 124. As with situation shown in FIG. 1A, it is assumed that the working set of each thread is large enough to populate the entire L2 cache. However, when the threads become co-runners on the multi-core processor 120, the L2 cache memory 130 is not equally allocated among the threads as illustrated by the shading 132 for the thread running on core 122 and the shading 134 for the thread running on core 124. Thus, cache sharing often depends solely on the cache needs of the co-runner(s), and unfair cache sharing occurs often. The cache occupancy of a thread affects its cache miss rate, and, as a result, impacts the rate at which the thread retires instructions. Therefore, the CPU performance of a thread significantly varies depending on its co-runner.

Figure 2A:
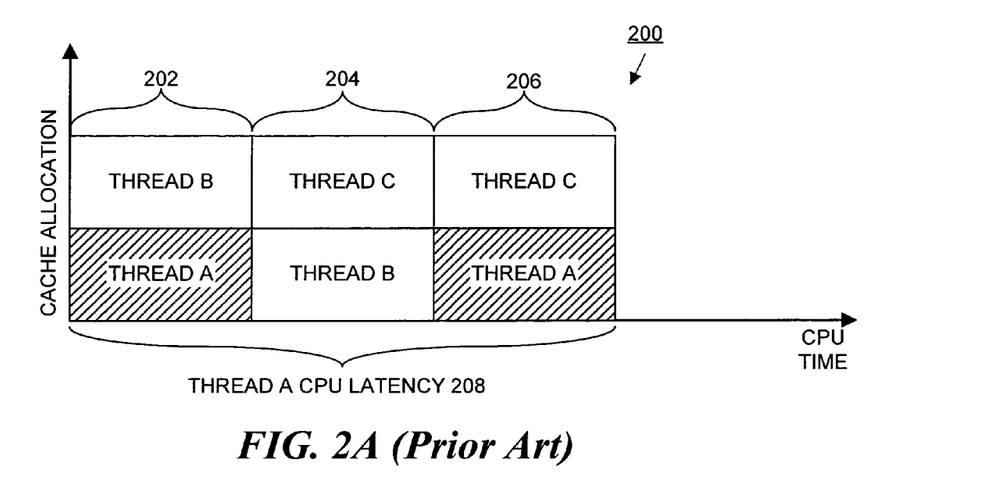
FIG. 2A is a graph that illustrates three threads running the dual-core processor of FIG. 1B and indicates the CPU latency of one thread in a scenario where all three threads share the common cache memory equally.
Figure 2B:
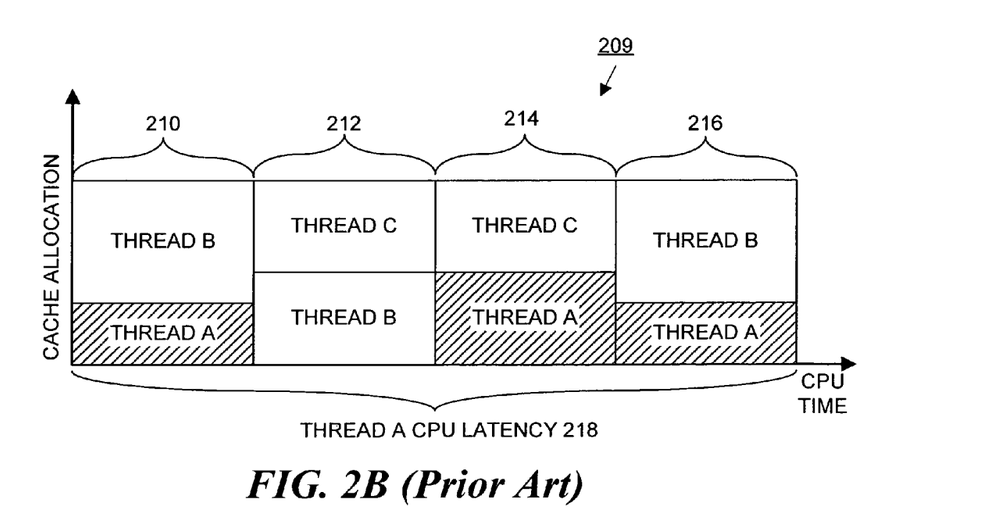
FIG. 2B is a graph that illustrates the same three threads as shown in FIG. 2A running the dual-core processor of FIG. 1B and indicates the CPU latency of one thread in a scenario where the three threads do not share the common cache memory equally.

Co-runner dependency is illustrated in FIGS. 2A and 2B. FIG. 2A depicts threads running in a processor with two processor cores operating with a conventional operating system scheduler in an ideal scenario where the L2 cache memory 130 is shared equally. The figure shows a graph 200 depicting cache memory allocation along the vertical axis and CPU time along the horizontal axis. There are three threads (A though C) running on the dual-core processor 120 and three CPU time slots 202-206 are illustrated. In the figure, a box corresponds to each thread. The height of the box indicates the amount of cache memory allocated to that thread. The width of the box indicates the CPU time quantum allocated to the thread. Accordingly, the area of the box is proportional to the amount of work completed by the thread. Thread boxes stacked on top of one another indicate co-runners. In this ideal situation, the L2 cache memory 130 is shared equally as indicated by the equal heights of the boxes.

The CPU latency of a thread is defined as the time to complete a logical unit of work and is a function of how efficiently the thread uses the CPU cycles it has been assigned and the length of time that thread runs on the CPU. In FIG. 2A, the work completed by thread A includes the shaded areas during time slots 202 and 206. Thus, assuming that a unit if work is equal to the sum of the two areas, the CPU latency of thread A is indicated by bracket 208.

FIG. 2B illustrates co-runner dependency in a processor with two processor cores operating with a conventional operating system scheduler. The figure also shows a graph 209 depicting cache memory allocation along the vertical axis and CPU time along the horizontal axis. The same three threads (A though C) as shown in FIG. 2A are running on the dual-core processor and four CPU time slots 210-216 are illustrated. As illustrated, thread B requires more L2 cache memory than thread A as shown by the increased height of its corresponding box. Thus, during time slot 210, thread A is cache-starved when it runs with thread B and suffers worse performance during time slot 210 than when it runs with thread C in time slot 212.

Consequently, thread A works less efficiently and completes less work per unit of time than it does in the situation shown in FIG. 2A because it does not get an equal share of the cache when running with thread B. As a result, thread A takes longer to complete the same amount of work; its CPU latency 218 is longer than its latency 208 under equal cache sharing.

Co-runner-dependent performance variability can create several problems. For example, it can cause unfair CPU sharing. In particular, conventional schedulers ensure that equal-priority threads get equal shares of CPU time. However, on multi-core processors a thread's share of CPU time, and thus its forward progress, is dependent both upon its time slice and the cache behavior of its co-runners. Benchmark tests have shown that many programs often run much slower with one co-runner than with another co-runner. Another problem is poor priority enforcement. A priority-based scheduler on a conventional processor ensures that elevating the priority of a job results in greater forward progress for that job. On a multi-core processor, if the high-priority job is scheduled with 'bad' co-runners, it still may experience inferior rather than superior performance.

Another problem is inadequate CPU accounting. Specifically, on grid-like systems where users are charged for CPU hours conventional scheduling ensures that processes are billed proportionally to the amount of computation accomplished by a job. On multi-core processors, the amount of computation performed in a CPU hour varies depending on the co-runners, so that charging for CPU hours is not accurate.

Thus, to achieve fair cache memory sharing on multi-core processors, such as processor 120, L2 cache memory allocation must be considered. However, fair cache memory sharing in a multi-core processor environment is more difficult than fair cache memory sharing in a shared-memory multiprocessor, where thread performance similarly depends on how much of the shared memory that thread is allocated. The fundamental difference is that the operating system software can observe and control memory allocation in a shared memory multiprocessor, but L2 cache allocation is accomplished with hardware and consequently is completely opaque to the operating system.

One conventional mechanism for insuring fair cache sharing is to use cache memory that can be dynamically partitioned among threads. However, this mechanism requires special hardware that may not be available on all processors. Consequently, an operating system solution is preferable, because it can have a much shorter time-to-market than a hardware solution. Additionally, it may be preferable to implement resource-allocation policies in the operating system rather than in the hardware, because the operating system is responsible for allocating the majority of hardware resources and it has a chance to balance any conflicts that may arise between different allocation policies. Hardware has less flexibility in this respect.

A further conventional software mechanism for insuring fair cache sharing is to implement "co-scheduling". Co-scheduling aims to select the "right" co-runner for a thread. However, co-scheduling requires the ability to determine how the performance of a thread is affected by a particular co-runner. One problem with this solution is that it may not be possible to find a suitable co-runner. Further, co-scheduling is difficult to implement without inter-core communication, because the decision to schedule a thread on a particular core requires knowledge of what other threads are running on the other cores. Thus, the technique may not scale well as the number of processor cores increases.

SUMMARY OF THE INVENTION

In accordance with the principles of the invention, an operating system scheduler adjusts the CPU latency of a thread to be equal to the CPU latency which that thread would experience when the cache memory was equally shared. In one embodiment, the CPU latency is computed as the product of thread cycles per instruction (CPI) and its CPU time quantum. Co-runner dependence affects the CPI of a thread because, for example, a cache-starved thread incurs more memory stalls, exhibiting a higher CPI. The operating system scheduler adjusts the CPU latency of a thread by adjusting the share of CPU time allotted to that thread.

In another embodiment, during a reconnaissance time period, the operating system scheduler gathers information regarding the threads via conventional hardware counters and uses an analytical model to estimate a fair cache miss rate that the thread would experience if the cache memory was equally shared. During a subsequent calibration period the operating system scheduler uses runtime statistics and the previously computed fair cache miss rate value to determine the fair CPI value that the thread would experience if cache memory was equally shared.

In still another embodiment, during the calibration period, the operating system scheduler measures the actual CPI value of a thread and compares the computed fair CPI value to the actual CPI value for that thread. Based on the comparison, the operating system scheduler adjusts the CPU time quantum of the thread to bring the CPU latency into line with that achieved by the thread with a fair CPI value.

In yet another embodiment, after adjusting the CPU time quantum of a thread during a time slot, the operating system scheduler selects another thread that is running in that time slot and adjusts its CPU time quantum to compensate for the adjustment made to the former thread.

In still another embodiment, calibration periods are repeated periodically during runtime. The reconnaissance period is also repeated periodically, but with a longer time period that the repetition period at which the calibration periods are repeated.

In another embodiment, during the reconnaissance time period, the operating system scheduler measures cache memory miss rates for each thread as that thread operates with other co-runners and derives a linear equation to estimate a fair cache miss rate that the thread would experience if the cache memory was equally shared.

DETAILED DESCRIPTION

Figure 3:
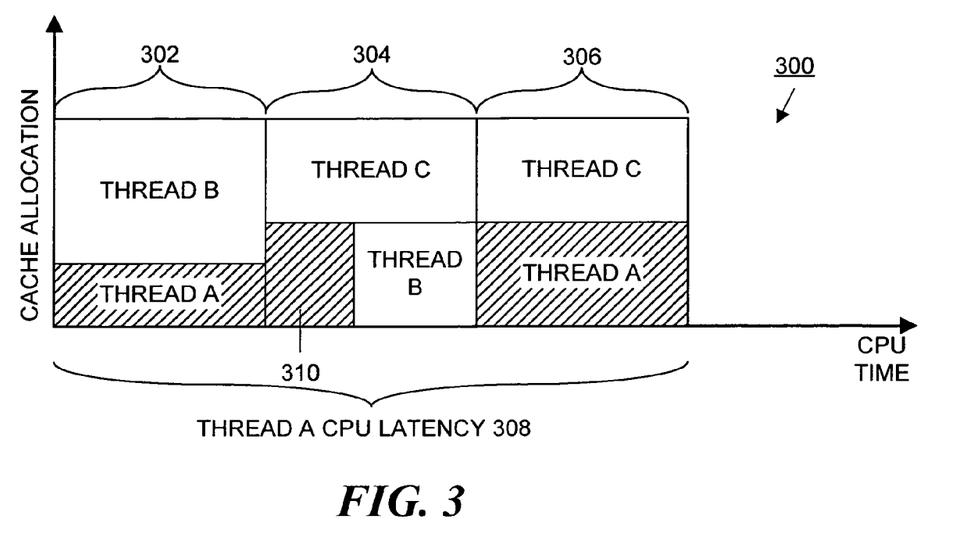
FIG. 3 is a graph that illustrates the same three threads as shown in FIG. 2A and indicates the CPU latency of one thread in a scenario where the three threads do not share the common cache memory equally, but the operating system controller runs the threads in accordance with the principles of the invention.

Like conventional operating system schedulers, a scheduler performing the inventive method runs periodically (for example on every system clock "tick") for each running thread. However, the scheduler also performs cache-fair specific processing as described in detail below. FIG. 3 illustrates how the inventive cache-fair method eliminates dependency of the performance of one thread on another thread. The figure illustrates the situation shown in FIG. 2B when the operating system scheduler 136 performs the cache-fair method. As illustrated in FIG. 2B, FIG. 3 shows a graph 300 depicting cache memory allocation along the vertical axis and CPU time along the horizontal axis. The same three threads (A though C) as shown in FIG. 2B are running on the dual-core processor and three CPU time slots 302-306 are illustrated. As illustrated, thread B requires more L2 cache memory than thread A as shown by the increased height of its corresponding box. However, the inventive method gives thread A more CPU cycles as indicated by the additional time 310 given to thread A. By increasing the CPU time, the inventive method allows thread A to achieve the same CPU latency 308 as the CPU latency 208 that was achieved under equal cache sharing as shown in FIG. 2A. Note that the adjustment provided by the method to the CPU time quantum of thread A is temporary. Once the thread completes any overdue work, its time quantum is restored to its initial value.

Giving more CPU time to one thread takes away time from another thread (or other threads) in general. In FIG. 3, time is taken away from thread B in time slot 304. Thus, in accordance with the inventive method, there are two classes of threads in the system: a "cache-fair" class and a "best-effort" class. In the example shown in FIG. 3, thread A is a "cache-fair" thread, and thread B is a "best-effort" thread. When performing the inventive method, an operating system scheduler reduces co-runner-dependent performance variability for threads in the cache-fair class, but not for threads in the best-effort class. However, the method avoids imposing significant performance penalties on best-effort threads. The class for a particular thread could be specified by a user in the same way that the thread priority is specified. For example, user jobs could be in the "cache-fair" class by default while background system jobs could default to the "best-effort" class. Because modern systems typically run dozens of background threads, the requirement that best-effort threads exist in the system is typically easily satisfied. The cache-fair scheduler method does not establish a new CPU sharing policy but helps enforce existing policies. For example, if the system is using a fair-share policy, the cache-fair method will make the cache-fair threads run as quickly as they would if the cache were shared equally, given the number of CPU cycles they are entitled to under the fair-share policy.

Figure 4:
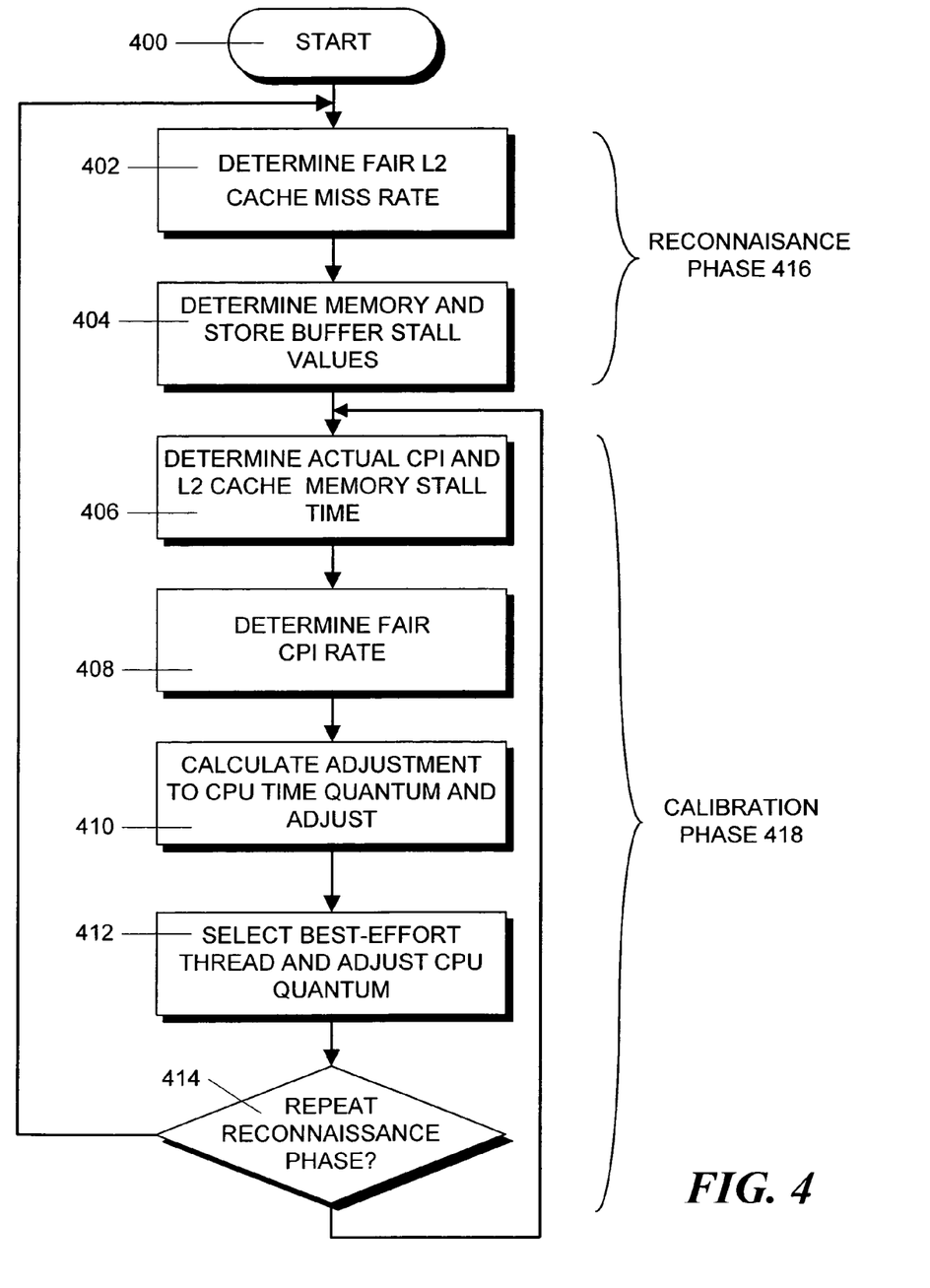
FIG. 4 is a flowchart showing the steps in an illustrative process run by the operating system scheduler to compensate for unequal cache memory sharing in accordance with the principles of the invention.

In one embodiment, the method adjusts the CPU time quantum of a cache-fair thread using a two-phase process that is illustrated in FIG. 4. In a system using this process, new threads in the system are initially assigned CPU time quanta according to a default scheduling policy. For new threads in the cache-fair class, the scheduler performs a "reconnaissance" phase and then a "calibration" phase. In the "reconnaissance" phase, the scheduler measures various thread characteristics over a period of time in order to estimate the number of instructions the thread would have completed during its time quantum under the existing scheduling policy if it had experienced equal cache sharing.

In the following "calibration" phase, the actual number of instructions that were completed is measured and compared to the estimated number of instructions. Based on the comparison, an adjustment to the CPU time quantum is calculated that will make the actual number of instructions equal to the estimated number of instructions. The CPU time quantum of the cache-fair thread is adjusted accordingly. Then a thread from the best effort class is selected and the CPU time quantum of the selected thread is adjusted to offset the adjustment to the cache-fair thread CPU time quantum. The calibration phase for each cache-fair thread is repeated periodically.

The reconnaissance and calibration phases performed for a cache-fair thread are shown in detail in FIG. 4. This process begins in step 400 and proceeds to step 402 where the reconnaissance phase 416 begins. The reconnaissance phase 416 comprises steps 402 and 404. In step 402, a determination is made of the fair L2 cache miss rate of the thread. The fair L2 cache miss rate is a miss rate that the thread would experience under equal cache sharing. In order to avoid excessive overhead at runtime, this miss rate is determined using only limited information from existing hardware counters that are typically available on existing processors. Such hardware counters can be configured to measure selected runtime statistics, such as the number of cache misses and retired instructions, but they do not reveal how the cache is actually shared or how the CPI rate is affected by unequal cache sharing. Consequently, the fair L2 cache miss rate is determined by using both information from hardware counters and an analytical model.

In one embodiment, the model is based on the empirical observation that if two co-runner threads have similar cache miss rates, then they share the L2 cache memory roughly equally. Consequently, if co-runner threads experience similar miss rates and share the L2 cache memory equally, they each experience their fair cache miss rate. In this situation the two threads are called "cache-friendly" co-runners. To estimate a fair cache miss rate for a selected thread, that thread is run with several different co-runners and the relationship between the L2 cache memory miss rate of the selected thread and its co-runner is derived. This relationship is then used to estimate the L2 cache miss rate that thread would experience with a "hypothetical" cache-friendly co-runner. This latter estimated miss rate is then used as the fair L2 cache miss rate for the selected thread.

Figure 5:
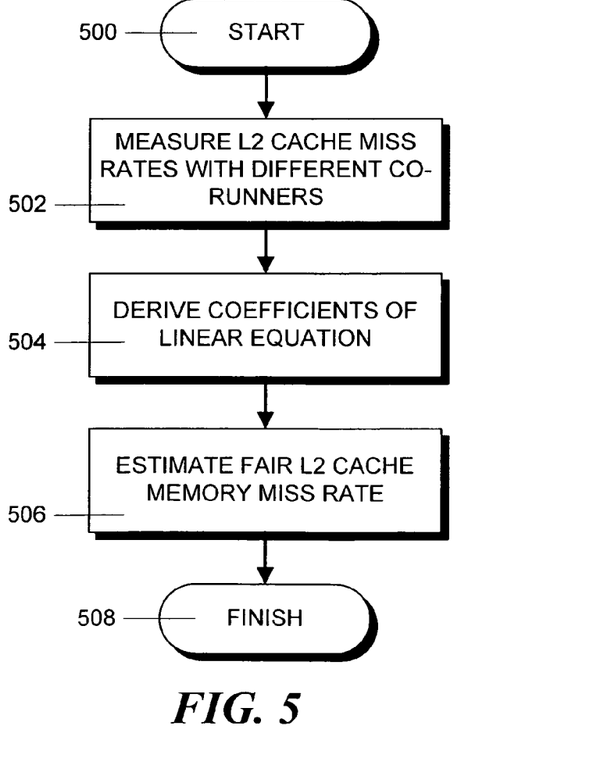
FIG. 5 is a flowchart showing the steps in an illustrative process for estimating the fair L2 cache memory as set forth in step 402 of FIG. 4.

FIG. 5 illustrates this process. The process begins in step 500 and proceeds to step 502 where the L2 cache memory miss rates are measured as the selected thread runs with different co-runners. The operating system scheduler does not force the selected thread to run with specific co-runners, but observes any co-runner combinations that appear on the processor. Whenever the selected thread appears on the CPU with a new group of co-runners, the hardware counters are reset. When any of the co-runners goes off the processor, the miss rate of the selected thread is recorded along with the overall miss rate of its co-runners, thereby generating a data point. This process is repeated for the duration of the reconnaissance phase.

The reconnaissance phase needs to be sufficiently long to capture the long-term properties of the workload cache access patterns. From empirical analysis of temporal variation of L2 cache access patterns for several benchmark programs, it was determined that most workloads (eight out of nine) had stable cache access patterns over time, and though there was occasional short-term variability, any window of 100 million instructions captured the long-term properties of the workload. Accordingly, in one embodiment, the duration of the reconnaissance phase is set to 100 million instructions. With the aforementioned reconnaissance phase duration, by the end of the reconnaissance phase, typically ten data points have been recorded.

Returning to FIG. 5, in step 504, a relationship between the L2 cache memory miss rate of the selected thread and its co-runners is derived. The fair L2 cache miss rate is the number of misses per cycle (MPC) that would be generated by a thread if the cache were shared equally. In order to derive this relationship, two assumptions are made: (1) cache-friendly co-runners have similar cache miss rates, and (2) the relationship between co-runner miss rates is linear. These assumptions can be justified by analytical and empirical analysis.

In accordance with the second assumption, the expression for the relationship between the co-runner miss rates for a processor with n+1 cores is:

$$MissRate(T) = a * \sum_{i=1}^{n} MissRate(C_i) + b \qquad (1)$$

where T is a thread for which the fair miss rate is computed, $C_i$ is the ith co-runner, n is the number of co-runners, and a and b are linear equation coefficients.

Thread T experiences its fair cache miss rate, FairMissRate (T), when all concurrent threads experience the same miss rate:

FairMissRate(T)=MissRate(T)=MissRate($C_i$) for all i.

When this happens, equation (1) can be expressed as:

FairMissRate(T)=a*n*FairMissRate(T)+b

And the expression for FairMissRate(T) is:

$$FairMissRate(t) = \frac{b}{1 - a*n} \qquad (2)$$

The inventive method dynamically derives coefficients a and b for Equation (1) for each cache-fair thread at runtime and then estimates a fair L2 cache memory miss rate for that thread using Equation (2). In particular, as set forth in step 504, the coefficients are derived by linear regression analysis applied to the data points that have been obtained during the reconnaissance phase. Implementations of linear regression analysis usually require floating-point operations, however some processor do not permit the use of floating point operations inside the kernel, in these cases linear regression can be implemented using only integer operations. Then, as set forth in step 506, Equation (2) is used to estimate a fair L2 cache memory miss rate for that thread. The process then finishes in step 508.

Returning to FIG. 4, the next step 404 in the process is to determine the values of two additional variables that are related to the per-thread stall time caused by an L2 cache memory miss. These variables are the per-thread memory stall time FairMemoryStalls, which includes stall time due to memory latency and memory bus delays, and the store buffer stall time FairStoreBufferStalls. A store buffer is a queue at the processor that allows non-blocking writes. A writing thread places a value in the store buffer and continues without waiting for the write to propagate down the memory hierarchy. However, if the store buffer becomes full, the thread stalls until space becomes available in the store buffer. The values of these variables are needed to calculate a value used for estimating the amount of CPU time quantum adjustment that must be made.

Figure 6:
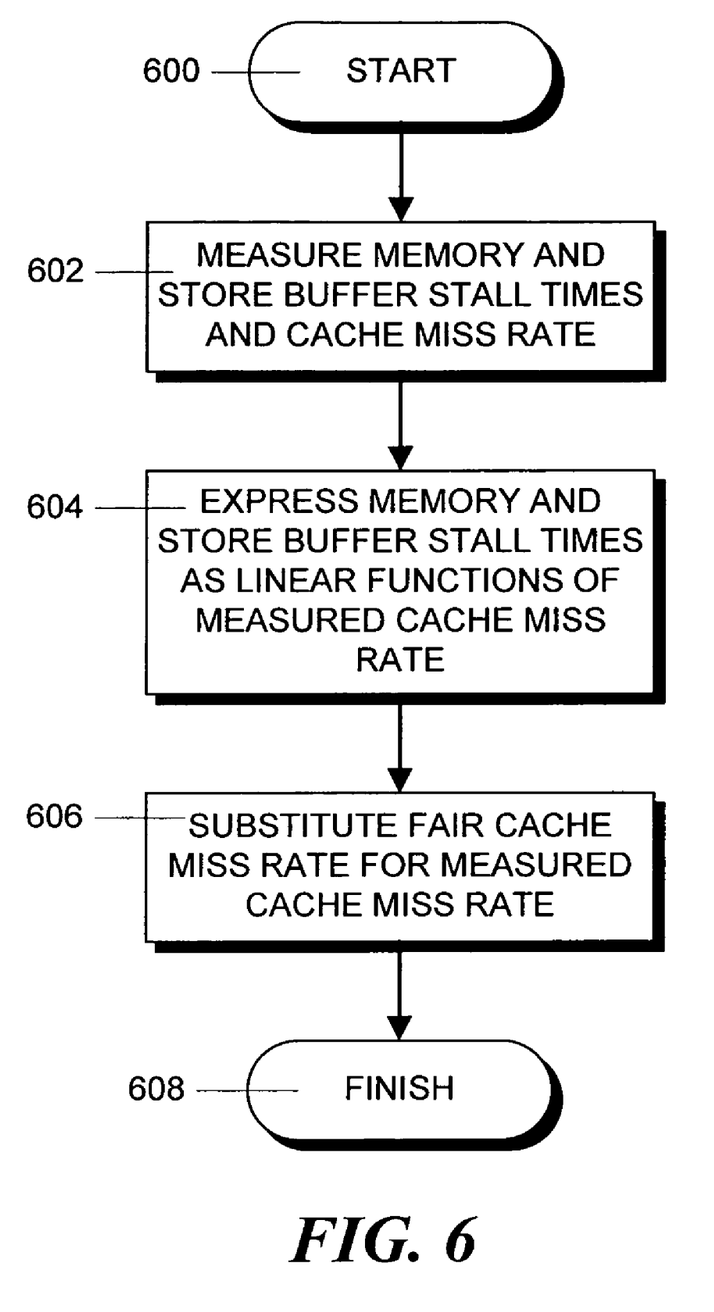
FIG. 6 is a flowchart showing the steps in an illustrative process for estimating memory and store buffer stall times that a thread would attain if it experienced its fair cache miss rate.

The actual values of these variables that are required correspond to the memory and store buffer stall times that a thread would attain if it experienced its fair cache miss rate. Since these values cannot be measured directly, in another embodiment, they are estimated using the process illustrated in FIG. 6. This process begins in step 600 and proceeds to step 602 where the actual memory and store buffer stall times and the actual cache miss rate are measured as the selected thread runs in the reconnaissance phase. In step 604, these measured values are expressed as linear equations of the measured cache miss rate of the selected thread. Then, in step 606, the fair L2 cache memory miss rate value determined in step 402 is substituted for the measured cache miss rate in these latter equations to compute the required FairMemoryStalls, FairStoreBufferStalls values. The process then finishes in step 608. The reconnaissance phase 416 is then complete.

Next, the thread enters the calibration phase 418 which consists of steps 406-414. During the calibration phase, the operating system scheduler periodically re-distributes, or calibrates, the CPU time quantum for the selected thread during repeated calibration cycles. A single calibration cycle involves adjusting CPU time quantum of the selected thread, based on how its actual CPI rate differs from an estimated fair CPI rate, and selecting a best-effort thread whose CPU time quantum is adjusted correspondingly.

In steps 406 and 408, the fair CPI rate, which is the number of cycles per instruction achieved by a thread under equal cache sharing is computed. The fair CPI rate is estimated using an existing analytical model adapted to the CPU architecture. Analytical models suitable for use with the present invention are described in detail in articles entitled "Analytical Analysis of Finite Cache Penalty and Cycles Per Instruction of a Multiprocessor Memory Hierarchy Using Miss Rates and Queuing Theory", R. E. Matick, T. J. Heller and M. Ignatowski, *IBM Journal of Research and Development*, v. 45, n. 6, November 2001 and "A Non-work-Conserving Operating System Scheduler for SMT Processors", A. Fedorova, M. Seltzer and M. Smith, *In Proceedings of the Workshop on the Interaction Between Operating Systems and Computer Architecture (WIOSCA)*, Boston, Mass., June 2006, the contents of which are hereby incorporated by reference.

The general form of a suitable model is:

CPI=IdealCPI+*L*2CacheStalls  (3)

where IdealCPI is the CPI when there are no L2 cache misses, and L2CacheStalls is the actual per-instruction stall time due to handling L2 cache misses.

The expression for the fair CPI value is:

FairCPI=IdealCPI+Fair*L*2CacheStalls  (4)

where FairCPI is the CPI when the thread experiences its fair cache miss rate.

Combining Equations (3) and (4) gives the FairCPI as:

FairCPI=CPI−*L*2CacheStalls+Fair*L*2CacheStalls  (5)

Thus, to estimate FairCPI, the actual CPI and the values of L2CacheStalls and FairL2CacheStalls must be determined. Returning to FIG. 4, in step 406, the actual CPI is determined by taking a ratio of the number of CPU cycles that the selected thread has executed and the number of instructions that the thread has retired.

In accordance with the aforementioned analytical model, the L2 cache memory stall time (L2CacheStalls) is a function of the cache miss rate, and the aforementioned cache memory miss stall time MemoryStalls and the store buffer stall time StoreBufferStalls:

*L*2CacheStalls=*F*(MissRate, MemoryStalls, StoreBufferStalls)  (6)

Thus, the actual L2 cache memory miss stall time is a function of the actual cache miss rate (MissRate), the actual cache memory miss stall time (MemoryStalls) and the actual store buffer stall time (StoreBufferStalls). In step 406, the actual cache miss rate and the actual memory and store buffer stall times are measured by hardware counters.

The FairL2CacheStalls value can be determined in accordance with the analytical model by using the fair L2 cache miss rate FairMissRate and memory and store buffer stall times that the selected thread would attain if it experienced its fair cache miss rate:

$$\text{Fair}L2\text{CacheStalls}=F(\text{FairMissRate, FairMemoryStalls, FairStoreBufferStalls}) \quad (7).$$

The FairL2CacheStalls is estimated using the model expressed by Equation (7) using inputs obtained using the inputs from the reconnaissance phase as discussed above.

In step 408 the FairCPI value is calculated using Equation (5) and the values obtained in steps 404 and 406.

In step 410, the CPU time quantum adjustment is determined by comparing the determined fair CPI rate of the selected thread to the actual CPI rate of that thread. Based on this comparison, the operating system scheduler estimates a temporary adjustment to the CPU time quantum, so that by the end of the next CPU time quantum, the selected thread completes the number of instructions corresponding to its fair CPI. Thus, if the selected thread has been running slower than it would have run at its fair CPI, its CPU time quantum is increased. If the selected thread has been running faster than it would have run at its fair CPI, its CPU time quantum is decreased.

In step 412, a best-effort thread is selected and the CPU time quantum of the selected best-effort thread is decreased or increased correspondingly. If the CPU time quantum is to be increased the best-effort thread that has suffered the most performance penalty is selected and compensated by increasing its CPU time quantum. If the CPU time quantum of the selected best-effort thread is to be decreased, the best-effort thread that has suffered the least performance penalty is selected. The adjustment to the CPU time quantum of the best-effort thread is temporary. Once the thread has run with the adjusted CPU time quantum for one time slot, its CPU time quantum is reset to its original value.

In the calibration phase, adjustments to the CPU time quanta are performed periodically, for example, every ten million instructions. Frequent adjustments allow the inventive method to be more responsive. However, the reconnaissance phase may be repeated occasionally to account for changes in cache access patterns of the selected thread, which would necessitate the need to re-compute its fair cache miss rate. Empirical data indicate that most workloads change their L2 cache access patterns gradually and infrequently, so in many cases, it is appropriate to choose a fixed-sized repetition interval for the reconnaissance phase. In one embodiment this fixed interval is set to one billion instructions.

For less-common workloads with frequently changing cache-access patterns, the frequency of reconnaissance phase may need to be determined dynamically. In these cases, known techniques for phase detection can be used to detect when the workload has changed its cache access patterns, and the reconnaissance phase can be performed every time such a change is detected.

Consequently, in step 414, a determination is made whether the reconnaissance phase must be repeated using either the fixed-interval or dynamic methods described above. If so, the process proceeds back to step 402 to repeat the reconnaissance phase. Alternatively, if, in step 414, it is determined that the reconnaissance phase does not have to be repeated, then the process proceeds back to steps 406-410 where the CPU time quantum adjustment is again calculated.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet.

The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, since modeling CPI as a function of cache miss rate has been well-studied and many accurate models are available, that the inventive technique can be applied to other processor systems that use different architectures, such as single and multithreaded cores, and single issue and multiple-issue pipelines. Further, the inventive technique is also applicable to processors with shared L1 or L3 cache memories. The order of the process steps may also be changed without affecting the operation of the invention. Other aspects, such as the specific process flow, as well as other modifications to the inventive concept are intended to be covered by the appended claims.

What is claimed is:

1. A method for achieving fair cache memory sharing in a processor having a plurality of cores, each of which has a thread running thereon, and a cache memory that is shared by the threads, the method comprising:

allotting a respective CPU time quantum to each of the threads, wherein the CPU time quantum allotted to each thread is the share of CPU time allotted for the thread to run on the processor;

computing for a given one of the threads a fair CPU latency value as a product of a value representing the number of thread cycles per instruction (CPI) which the given thread would experience in the case that the cache memory was equally shared by the threads and the CPU time quantum that was allotted to the given thread;

computing an actual CPU latency value as a product of the actual number of thread cycles per instruction which the given thread is currently experiencing and the CPU time quantum that was allotted to the given thread; and performing an adjustment to the CPU time quantum allotted to the given thread, wherein the adjustment causes the actual CPU latency value of the given thread to become equal to the computed fair CPU latency value.

2. The method of claim 1, wherein said performing an adjustment is done by an operating system scheduler.

3. The method of claim 1, wherein said computing a fair CPU latency value comprises:
during a reconnaissance phase, gathering information regarding the given thread via conventional hardware counters; and
using an analytical model to estimate a fair cache miss rate that the given thread would experience if the cache memory was equally shared.

4. The method of claim 3, wherein said computing a fair CPU latency value further comprises:
during a calibration phase subsequent to the reconnaissance phase, using runtime statistics and the estimated fair cache miss rate value to determine a fair CPI value as the CPI value that the thread would experience if the cache memory was equally shared.

5. The method of claim 4, wherein said computing an actual CPU latency value comprises:
during the calibration phase, measuring the actual CPI value of the given thread and comparing the determined fair CPI value to the actual CPI value for the given thread.

6. The method of claim 3, wherein said estimating a fair cache miss rate further comprises, during the reconnaissance phase, measuring cache memory miss rates for the given thread as the given thread operates with other concurrently running threads, and deriving a linear equation to estimate the fair cache miss rate as the cache miss rate that the given thread would experience if the cache memory was equally shared.

7. The method of claim 4, further comprising repeating the calibration phase periodically during runtime.

8. The method of claim 7, further comprising repeating the reconnaissance phase periodically during runtime, wherein the reconnaissance phase is repeated with a period that is longer than the period at which the calibration phase is repeated.

9. The method of claim 2, further comprising:
after adjusting the CPU time quantum of the given thread during a given time slot, selecting another thread that is running in the given time slot; and
the operating system scheduler adjusting a CPU time quantum of the other thread to compensate for the adjustment made to the CPU time quantum of the given thread.

10. Apparatus for achieving fair cache memory sharing in a processor having a plurality of cores, each of which has a thread running thereon, and a cache memory that is shared by the threads, the apparatus comprising:
a mechanism that allots a respective CPU time quantum to each of the threads, wherein the CPU time quantum allotted to each thread is the share of CPU time allotted for the thread to run on the processor;
a mechanism that computes for a given one of the threads a fair CPU latency value as a product of a value representing the number of thread cycles per instruction (CPI) which the given thread would experience in the case that the cache memory was equally shared by the threads and the CPU time quantum that was allotted to the given thread;
a mechanism that computes an actual CPU latency value as a product of the actual number of thread cycles per instruction which the given thread is currently experiencing and the CPU time quantum that was allotted to the given thread; and
a mechanism that performs an adjustment to the CPU time quantum allotted to the given thread, wherein the adjustment causes the actual CPU latency value of the given thread to become equal to the computed fair CPU latency value.

11. The apparatus of claim 10, wherein said performing an adjustment is done by an operating system scheduler.

12. The apparatus of claim 10, wherein the mechanism that computes the fair CPU latency value comprises:
a mechanism that, during a reconnaissance phase, gathers information regarding the given thread via conventional hardware counters; and
a mechanism that uses an analytical model to estimate a fair cache miss rate that the given thread would experience if the cache memory was equally shared.

13. The apparatus of claim 12, wherein the mechanism that computes the fair CPU latency value further comprises:
a mechanism that, during a calibration phase subsequent to the reconnaissance phase, uses runtime statistics and the estimated fair cache miss rate value to determine a fair CPI value as the CPI value that the thread would experience if the cache memory was equally shared.

14. The apparatus of claim 13, wherein the mechanism that computes an actual CPU latency value comprises:
a mechanism that, during the calibration phase, measures the actual CPI value of the given thread and compares the determined fair CPI value to the actual CPI value for the given thread.

15. The apparatus of claim 12, wherein the mechanism that estimates the fair cache miss rate further comprises a mechanism that, during the reconnaissance phase, measures cache memory miss rates for the given thread as the given thread operates with other concurrently running threads, and derives a linear equation to estimate the fair cache miss rate that the given thread would experience if the cache memory was equally shared.

16. The apparatus of claim 13, further comprising a mechanism that causes the calibration phase to be repeated periodically during runtime.

17. The apparatus of claim 16, further comprising a mechanism that causes the reconnaissance phase to be repeated periodically during runtime, wherein the reconnaissance phase is repeated with a period that is longer than the period at which the calibration phase is repeated.

18. The apparatus of claim 10, further comprising:
a mechanism that, after the mechanism for adjusting the CPU time quantum of the given thread adjusts the CPU time quantum of the given thread during a given time slot, selects another thread that is running in the given time slot; and
a mechanism that adjusts a CPU time quantum of the other thread to compensate for the adjustment made to the CPU time quantum of the given thread.

19. Apparatus for achieving fair cache memory sharing in a processor having a plurality of cores, each of which has a thread running thereon, and a cache memory that is shared by the threads, the apparatus comprising:
means for allotting a respective CPU time quantum to each of the threads, wherein the CPU time quantum allotted to each thread is the share of CPU time allotted for the thread to run on the processor;
means for computing for a given one of the threads a fair CPU latency value as a product of a value representing the number of thread cycles per instruction (CPI) which the given thread would experience in the case that the cache memory was equally shared by the threads and the CPU time quantum that was allotted to the given thread;

means for computing an actual CPU latency value as a product of the actual number of thread cycles per instruction which the given thread is currently experiencing and the CPU time quantum that was allotted to the given thread; and means for performing an adjustment to the CPU time quantum allotted to the given thread, wherein the adjustment causes the actual CPU latency value of the given thread to become equal to the computed fair CPU latency value.

20. The apparatus of claim 19, wherein the means for performing an adjustment comprises an operating system scheduler that adjusts the CPU time quantum allotted to the given thread.

* * * * *